(12) United States Patent
Reski

(10) Patent No.: US 12,421,685 B2
(45) Date of Patent: Sep. 23, 2025

(54) TOWER STRUCTURE BALLAST TRAY INTERFACE

(71) Applicant: GREAT PLAINS TOWER PRODUCTS LLC, Fargo, ND (US)

(72) Inventor: Kevin Reski, West Fargo, ND (US)

(73) Assignee: GREAT PLAINS TOWER PRODUCTS LLC, Fargo, ND (US)

( * ) Notice: Subject to any disclaimer, the term of this patent is extended or adjusted under 35 U.S.C. 154(b) by 175 days.

(21) Appl. No.: 18/489,709

(22) Filed: Oct. 18, 2023

(65) Prior Publication Data

US 2024/0052590 A1   Feb. 15, 2024

Related U.S. Application Data

(63) Continuation of application No. 18/157,813, filed on Jan. 21, 2023, now Pat. No. 11,795,724, and a continuation of application No. 18/046,313, filed on Oct. 13, 2022, now Pat. No. 11,814,807, said application No. 18/157,813 is a continuation of application No. 17/818,882, filed on Aug. 10, 2022, now Pat. No. 11,613,902.

(51) Int. Cl.
| | |
|---|---|
| *E04H 12/10* | (2006.01) |
| *E02D 27/42* | (2006.01) |
| *E04H 12/18* | (2006.01) |
| *E04H 12/22* | (2006.01) |
| *F16M 5/00* | (2006.01) |

(52) U.S. Cl.
CPC ............. *E02D 27/42* (2013.01); *E04H 12/10* (2013.01); *E04H 12/187* (2013.01); *E04H 12/2246* (2013.01); *F16M 5/00* (2013.01)

(58) Field of Classification Search
CPC ....... E02D 27/42; E04H 12/10; E04H 12/187; E04H 12/2246; F16M 5/00; H01Q 1/1242
USPC .......................................... 248/678; 405/229
See application file for complete search history.

(56) References Cited

U.S. PATENT DOCUMENTS

| | | | |
|---|---|---|---|
| 434,639 A | 8/1890 | Maxwell | |
| 456,193 A * | 7/1891 | Detlef | F03D 13/20 169/25 |
| 1,586,085 A | 5/1926 | Hill | |

(Continued)

FOREIGN PATENT DOCUMENTS

| | | |
|---|---|---|
| CN | 104944300 A | 9/2015 |
| CN | 105569054 A | 5/2016 |

(Continued)

OTHER PUBLICATIONS

Machine translation of FR 2811359 (Year: 2002).*
Machine translation of FR 2702596 (Year: 1994).*

*Primary Examiner* — Taylor Morris
(74) *Attorney, Agent, or Firm* — Fargo Patent & Business Law; Thomas Kading; Joshua Krnak

(57) ABSTRACT

A tower structure includes a tower comprising a tower aperture arrangement; a ballast tray comprising a support interface; and an interface plate comprising a mount aperture arrangement and an interface plate aperture arrangement, the mount aperture arrangement within the interface plate aperture arrangement, the interface plate attachable to the support interface, the mount aperture arrangement specific to the tower which is to be mounted to the interface plate at the mount aperture arrangement via the tower aperture arrangement.

12 Claims, 15 Drawing Sheets

(56) References Cited

U.S. PATENT DOCUMENTS

| | | | |
|---|---|---|---|
| 1,676,161 A * | 7/1928 | Schiller | E04H 12/10 |
| | | | 187/242 |
| 1,796,720 A | 3/1931 | Porter | |
| 1,836,865 A * | 12/1931 | Norman | E04H 12/10 |
| | | | 403/175 |
| 1,858,925 A | 5/1932 | Goodrich | |
| 1,906,634 A | 5/1933 | Leake | |
| 2,008,931 A * | 7/1935 | Schuler | H01Q 1/1242 |
| | | | 343/849 |
| 2,036,047 A | 3/1936 | Hill | |
| 2,705,061 A | 3/1955 | Getz | |
| 2,740,504 A | 4/1956 | Bailey | |
| 2,804,950 A | 9/1957 | Leslie, Jr. | |
| 2,828,841 A | 4/1958 | Weeks | |
| 2,828,931 A | 4/1958 | Harvey | |
| 2,882,810 A | 4/1959 | Goettl | |
| 2,942,700 A | 6/1960 | Parmenter | |
| 3,022,028 A | 2/1962 | Reinhard | |
| 3,119,471 A | 1/1964 | Turner | |
| 3,119,588 A | 1/1964 | Keats | |
| 3,321,160 A * | 5/1967 | Turnbull | E04H 12/2261 |
| | | | 52/114 |
| 3,477,668 A | 11/1969 | Tippmann | |
| 3,561,711 A * | 2/1971 | Dodge | E04H 12/20 |
| | | | 248/163.1 |
| 4,185,288 A | 1/1980 | Dosch | |
| 4,191,356 A | 3/1980 | Ashmun | |
| 4,503,645 A * | 3/1985 | Nudd | E04H 12/2261 |
| | | | 52/651.01 |
| 4,633,624 A | 1/1987 | Targetti | |
| 4,649,675 A | 3/1987 | Moldovan | |
| 4,660,799 A | 4/1987 | Butland | |
| 4,785,593 A | 11/1988 | Munoz, Jr. | |
| 4,899,500 A * | 2/1990 | Miller | E04H 12/10 |
| | | | 52/146 |
| 4,989,826 A * | 2/1991 | Johnston, Jr. | F24F 13/32 |
| | | | 248/676 |
| 5,142,293 A | 8/1992 | Ross | |
| 5,149,050 A | 9/1992 | Smith | |
| 5,257,489 A | 11/1993 | Angelette | |
| 5,297,770 A | 3/1994 | Drexel | |
| 5,480,265 A | 1/1996 | Marshall | |
| 5,531,419 A | 7/1996 | Gustafsson | |
| 5,878,540 A | 3/1999 | Morstein | |
| 6,058,299 A | 5/2000 | Lyseng | |
| 6,095,482 A | 8/2000 | LaGrotta | |
| 6,199,818 B1 | 3/2001 | Tsappi | |
| 6,266,938 B1 | 7/2001 | Sheu | |
| 6,379,085 B1 * | 4/2002 | Vanderklaauw | E04G 1/17 |
| | | | 405/230 |
| 6,464,196 B1 | 10/2002 | Crookham | |
| 6,578,339 B1 * | 6/2003 | McGinnis | E04H 12/10 |
| | | | 52/645 |
| 6,702,522 B2 * | 3/2004 | Silber | E02D 27/42 |
| | | | 405/229 |
| 6,781,558 B2 * | 8/2004 | Steinkamp | H01Q 1/1242 |
| | | | 343/890 |
| 6,798,387 B2 | 9/2004 | Cockell | |
| 6,820,389 B1 | 11/2004 | Macchietto | |
| 6,889,953 B2 | 5/2005 | Harbaugh | |
| 6,981,685 B1 | 1/2006 | McHugh | |
| 7,098,864 B2 | 8/2006 | Ryan | |
| 7,191,792 B2 | 3/2007 | Hendrix | |
| 7,225,589 B1 * | 6/2007 | Smith | E02D 27/02 |
| | | | 52/297 |
| 7,726,091 B2 | 6/2010 | Klaus | |
| 8,056,299 B2 | 11/2011 | Liskey | |
| 8,319,697 B2 | 11/2012 | Conrad | |
| 8,333,500 B1 | 12/2012 | Melvin | |
| 8,695,305 B2 | 4/2014 | Gallagher | |
| 9,188,276 B2 * | 11/2015 | Klein | F16M 11/36 |
| 9,499,954 B2 | 11/2016 | Honglang | |
| 9,518,402 B1 * | 12/2016 | Kundel, Sr. | B66C 23/62 |
| 9,540,840 B2 | 1/2017 | Ma | |
| 9,669,369 B1 | 6/2017 | Mees | |
| 9,863,161 B2 | 1/2018 | Anderson | |
| 10,125,506 B2 | 11/2018 | Cusson | |
| 10,378,231 B1 | 8/2019 | Sharpe | |
| 10,501,957 B1 | 12/2019 | Borowiak | |
| 10,604,952 B2 * | 3/2020 | Clark | E02D 27/02 |
| 10,813,425 B2 | 10/2020 | Shen | |
| 11,146,866 B2 | 10/2021 | Hon | |
| 11,242,694 B2 | 2/2022 | Bucarizza | |
| 11,613,902 B1 | 3/2023 | Reski | |
| 11,795,724 B1 * | 10/2023 | Reski | E04H 12/10 |
| 2005/0166485 A1 | 8/2005 | Sugimoto | |
| 2006/0016140 A1 | 1/2006 | Smith | |
| 2007/0175134 A1 | 8/2007 | Christenson | |
| 2007/0187564 A1 * | 8/2007 | McGuire | E04H 12/2261 |
| | | | 248/346.5 |
| 2010/0162652 A1 * | 7/2010 | Croes | F03D 13/20 |
| | | | 52/651.01 |
| 2011/0005161 A1 | 1/2011 | Noble | |
| 2012/0131879 A1 | 5/2012 | Bergman | |
| 2013/0047544 A1 | 2/2013 | Dayton | |
| 2014/0059957 A1 | 3/2014 | Stark | |
| 2014/0247542 A1 | 9/2014 | Fong | |
| 2015/0308140 A1 | 10/2015 | Clifton | |
| 2015/0323124 A1 | 11/2015 | Erdos | |
| 2016/0060886 A1 * | 3/2016 | Cook | E04G 23/0225 |
| | | | 52/514 |
| 2016/0369522 A1 | 12/2016 | Sanz Pascual | |
| 2021/0002844 A1 * | 1/2021 | Aitchison | E02D 27/01 |
| 2021/0246682 A1 | 8/2021 | Abrams | |
| 2021/0262247 A1 * | 8/2021 | Kightlinger | E04H 12/2261 |
| 2023/0094617 A1 | 3/2023 | Sean | |

FOREIGN PATENT DOCUMENTS

| | | | | |
|---|---|---|---|---|
| CN | 111877390 A | | 11/2020 | |
| CN | 112227411 A | | 1/2021 | |
| DE | 10316029 B3 | | 8/2004 | |
| DE | 102022106027 A1 | | 9/2022 | |
| EP | 2431532 A2 * | | 3/2012 | E02D 27/425 |
| EP | 3342305 A1 | | 7/2018 | |
| ES | 2307348 A1 | | 11/2008 | |
| FR | 2702596 A1 * | | 9/1994 | H01Q 1/1242 |
| FR | 2811359 A3 | | 1/2002 | |
| FR | 3127969 A1 | | 4/2023 | |
| GB | 2401380 A * | | 11/2004 | E02D 27/01 |
| KR | 101318206 B1 * | | 10/2013 | H01Q 1/1207 |
| KR | 20240136301 A * | | 9/2024 | E04H 12/2215 |
| WO | WO-2005103417 A1 * | | 11/2005 | H01Q 1/1235 |
| WO | WO-2009156827 A1 * | | 12/2009 | H01Q 1/1207 |

\* cited by examiner

BALLAST TRAY FOR GPT 30' 6" SQ. TUBING + 4' TOP PIPE
(ANALYSIS PER TIA-222-G)

BASE REACTIONS $V = 0.57$ KIP $H = 1.9$ KIP $M = 38.5$ KIP-FT

BALLAST TRAY (1900#)
8'- 6" x 8'- 6" x 1'- 4" TALL

CHECK FOR OVERTURNING @ A $M_R = (1.90 + 0.57 + 12.5)(4.25) = 63.6$ K-FT $M_{O_A} = 38.5 + (1.9)(1.33) = 41.0$ K-FT $M_R/M_O = (63.6)/(41.0) = 1.55$ ∴ OK

WELDED BALLAST TRAY CONTAINS 3.1 CU YD
(12,500#) OF CONCRETE IN BALLAST TRAY

CHECK FOR SLIDING $u = .3$ $F_{SL} = (0.3)(1.9 + 0.57 + 12.5) = 4.49$ KIP 4.49 KIP > 1.9 KIP ∴ ok

FIG. 13

TOWER STRUCTURE BALLAST TRAY INTERFACE

CROSS-REFERENCE TO RELATED APPLICATION(S)

The present disclosure is a Continuation of U.S. patent application Ser. No. 18/046,313 filed Oct. 13, 2022 and of U.S. patent application Ser. No. 18/157,813 filed Jan. 21, 2023 which is a Continuation of U.S. patent application Ser. No. 17/818,882 filed Aug. 10, 2022 which issued Mar. 28, 2023 as U.S. Pat. No. 11,613,902.

The contents of each aforementioned patent application are hereby incorporated by reference in their entirety.

BACKGROUND

The present disclosure relates to tower structures, and more particularly to an interface with a ballast tray assembly.

Equipment such as antennas, cameras, and the like are often mounted on tower structures to provide optimal operating positions. The towers are often mounted on a ballast tray assembly which supports the tower without having to install a pier in the ground. High wind conditions are a significant concern for all such towers.

SUMMARY

A tower structure according to one disclosed non-limiting embodiment of the present disclosure includes a tower comprising a tower aperture arrangement; a ballast tray comprising a support interface; and an interface plate comprising a mount aperture arrangement and an interface plate aperture arrangement, the mount aperture arrangement within the interface plate aperture arrangement, the interface plate attachable to the support interface, the mount aperture arrangement specific to the tower which is to be mounted to the interface plate at the mount aperture arrangement via the tower aperture arrangement.

A further embodiment of any of the foregoing embodiments of the present disclosure includes that the tower is a hinged lattice tower.

A further embodiment of any of the foregoing embodiments of the present disclosure includes that the tower comprises a base lattice section that comprises a first leg, a second leg, and a third leg forming a triangular base lattice section of the tower, the first, the second and the third leg each constructed of galvanized steel.

A further embodiment of any of the foregoing embodiments of the present disclosure includes a tower lattice section hinged to the base lattice section, the tower lattice section comprises a first, second and third leg each constructed of aluminum.

A further embodiment of any of the foregoing embodiments of the present disclosure includes a foot welded to each leg of the tower, each foot having an aperture to form the tower aperture arrangement; an inner gusset welded to each foot and the respective leg, the inner gusset extends toward an inner edge of the respective foot; and an outer gusset welded to each foot, the outer gusset extends toward the aperture of the respective foot.

A further embodiment of any of the foregoing embodiments of the present disclosure includes that the outer gusset defines an angle with respect to an axis between a center of the aperture and the leg.

A further embodiment of any of the foregoing embodiments of the present disclosure includes that the angle is 28 degrees.

A further embodiment of any of the foregoing embodiments of the present disclosure includes that the outer gusset extends for a length greater than the inner gusset with respect to the leg.

A further embodiment of any of the foregoing embodiments of the present disclosure includes that the tower is attachable to the mount aperture arrangement via a fastener through each aperture of the mount aperture arrangement and the tower aperture arrangement.

A further embodiment of any of the foregoing embodiments of the present disclosure includes that the support interface comprises a ballast tray assembly aperture arrangement, the interface plate attachable to the support interface via a fastener through each aperture of the ballast tray assembly aperture arrangement and a respective aperture of the interface plate aperture arrangement.

A further embodiment of any of the foregoing embodiments of the present disclosure includes a central aperture located at a center of the interface plate, wherein the central aperture is sized to receive a container.

A further embodiment of any of the foregoing embodiments of the present disclosure includes that the interface plate is welded to the support interface.

A further embodiment of any of the foregoing embodiments of the present disclosure includes that the tower is attachable to the mount aperture arrangement via a fastener through each aperture of the mount aperture arrangement and the tower aperture arrangement.

A further embodiment of any of the foregoing embodiments of the present disclosure includes that the support interface is formed by a ballast tray assembly aperture arrangement through a multiple of flanges around a center compartment.

A further embodiment of any of the foregoing embodiments of the present disclosure includes a multiple of I-beams which comprise the multiple of flanges around the center compartment.

A further embodiment of any of the foregoing embodiments of the present disclosure includes that the multiple of I-beams comprise: a first side I-beam; a second side I-beam parallel to the first side I-beam; a first cross I-beam between the first side I-beam and the second side I-beam and perpendicular thereto; a second cross I-beam between the first side I-beam and the second side I-beam and perpendicular thereto; a third cross I-beam between the first side I-beam and the second side I-beam and perpendicular thereto; a fourth cross I-beam between the first side I-beam and the second side I-beam and perpendicular thereto; and a first interface beam and a second interface beam parallel to the first side I-beam and the second side I-beam between the second cross I-beam and the third cross I-beam to provide a support interface at a center of the ballast tray assembly.

A further embodiment of any of the foregoing embodiments of the present disclosure includes a subfloor attached to the first side I-beam, the second side I-beam, the first cross I-beam, the second cross I-beam, the third cross I-beam, the fourth cross I-beam, the first interface beam, and the second interface beam.

A further embodiment of any of the foregoing embodiments of the present disclosure includes that each of the first, the second, the third and the fourth cross I-beam comprises a flange with a profiled end to interface with the first side I-beam and the second side I-beam.

A further embodiment of any of the foregoing embodiments of the present disclosure includes that the ballast tray assembly forms a rectilinear arrangement with seven compartments, each of the seven compartments comprise a drain hole through a subfloor.

A further embodiment of any of the foregoing embodiments of the present disclosure includes that the ballast tray is 8.5 feet by 8.5 feet and 1 foot 4 inches tall, contains 3.1 cubic yards of concrete, and resists overturning and sliding for a 30 foot tall, 6 inch square tubing, lattice tower with a 4 foot tall top pipe mounted thereto.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 13 is a mathematical representation of the ballast tray resistance to overturning and sliding according to a disclosed non-limiting embodiment.

DETAILED DESCRIPTION

Figure 1:
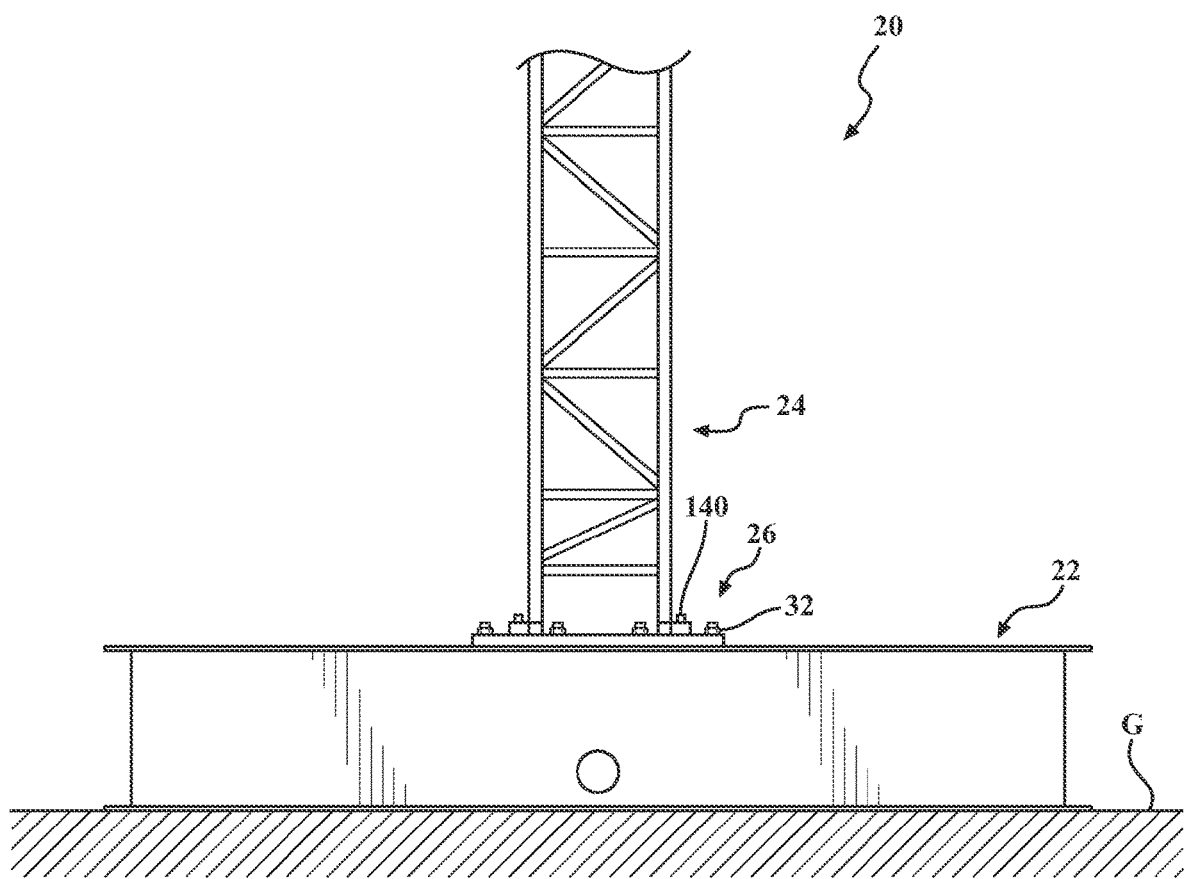
FIG. 1 is an expanded partial side view of a tower structure according to one disclosed non-limiting embodiment.

FIG. 1 schematically illustrates a tower structure 20 that is utilized to erect various instruments. The tower structure 20 generally includes a ballast tray 22 that is located on the ground G to support a tower 24 via an interface plate 26. The ballast tray 22 in this embodiment may be, for example, 8.5 feet by 8.5 feet and 16 inches tall. The ballast tray 22 is typically filled with a concrete material, in one example, 12,500 pounds of concrete within a 1,900 pound ballast tray 22, to provide a stable base for the tower 24 which is mounted thereto via the interface plate 26. Although the tower 24 is illustrated in this disclosed embodiment, the interface plate 26 and ballast tray 22 may provide a configurable interface for various other poles, towers, etc. Other ballast tray embodiments such as, for example, 10.5 feet by 10.5 feet and 16 inches tall, with a proportional amount of concrete material.

Figure 2:
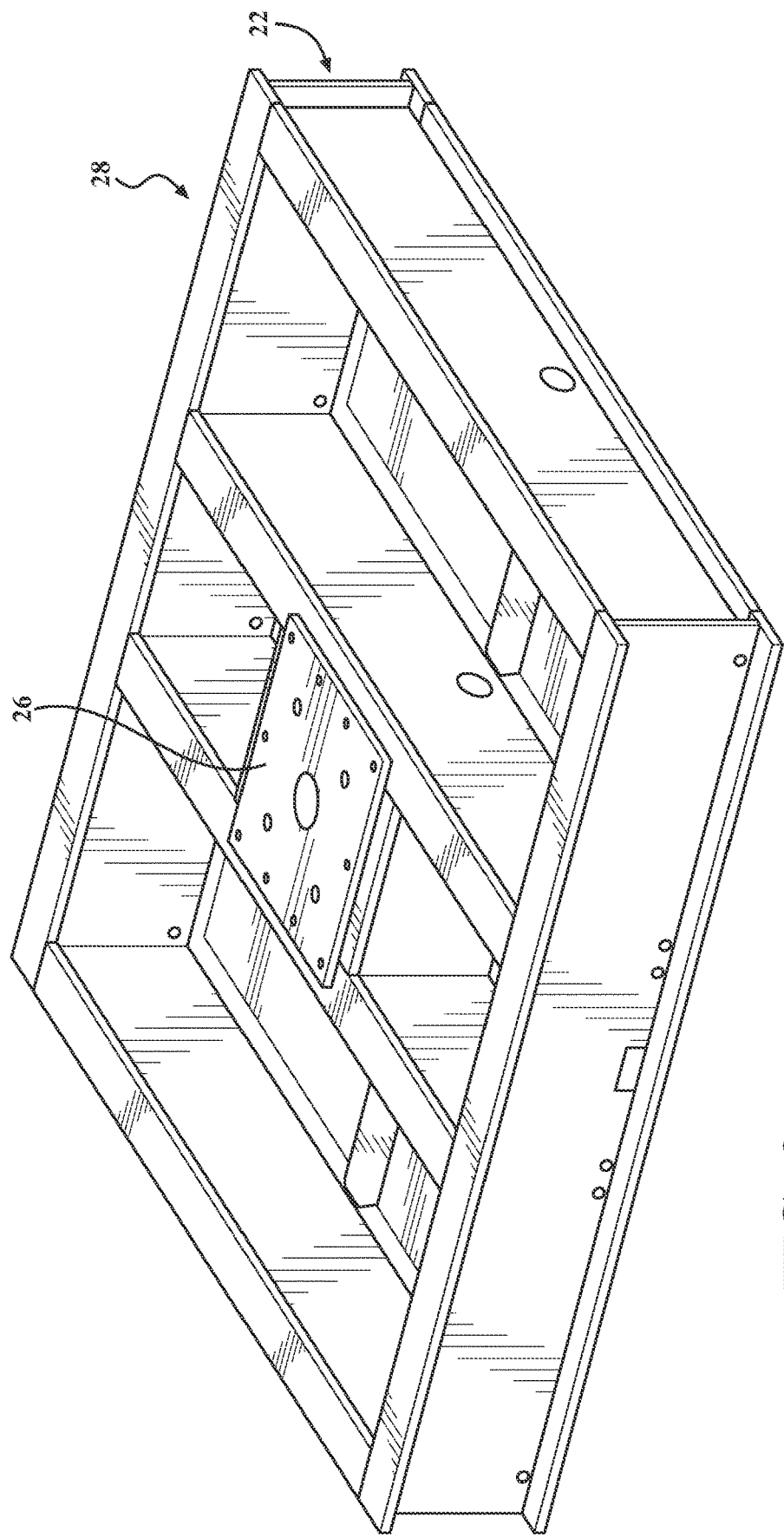
FIG. 2 is a perspective view of a ballast tray assembly according to a disclosed non-limiting embodiment.

With reference to FIG. 2, the ballast tray 22 is a common component which is individualized by attachment of one of a multiple different interface plates 26, each of which provide the tower mounting arrangement for that which is to be supported by a ballast tray assembly 28. That is, the interface plate 26 includes an interface plate aperture arrangement 30 (FIG. 3) which corresponds with a ballast tray assembly aperture arrangement 32 (FIG. 4) on the ballast tray 22 but also includes a mount aperture arrangement 140 (FIG. 3) which is specific to the tower which is mounted to the interface plate. Alternatively, the interface plate 26 may be welded to the ballast tray 22.

Figure 4:
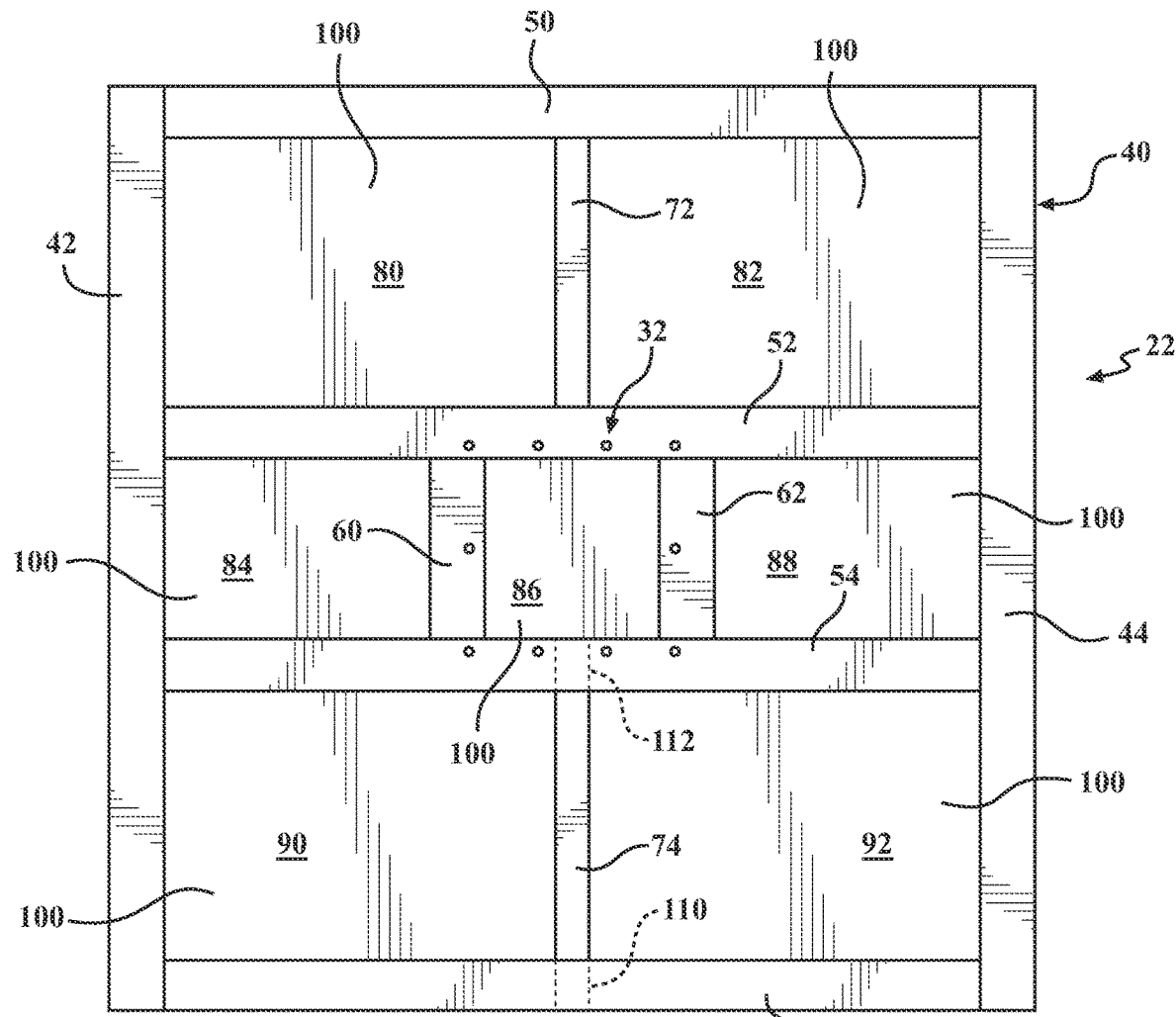
FIG. 4 is a top view of a ballast tray according to a disclosed non-limiting embodiment.
Figure 5:
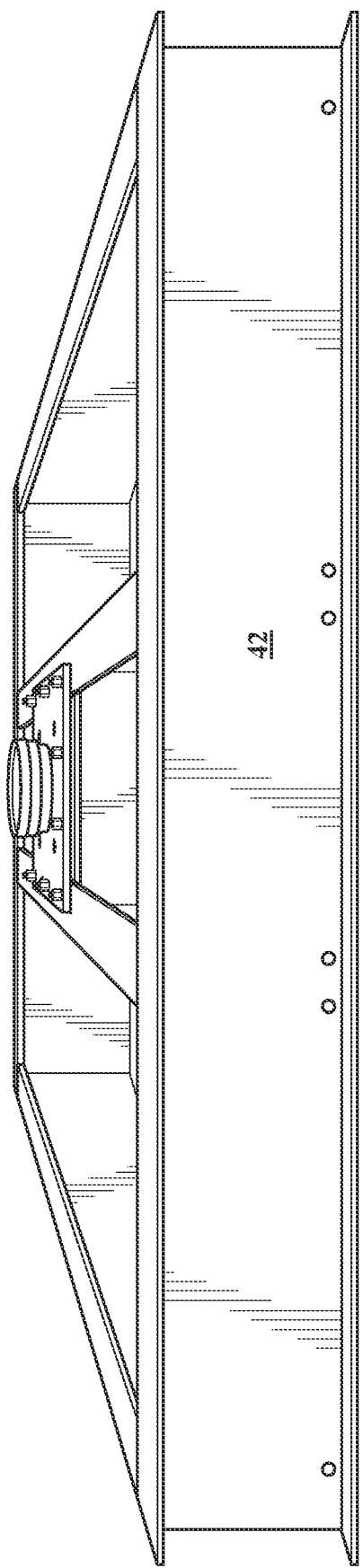
FIG. 5 is a front perspective view of a ballast tray assembly.
Figure 6:
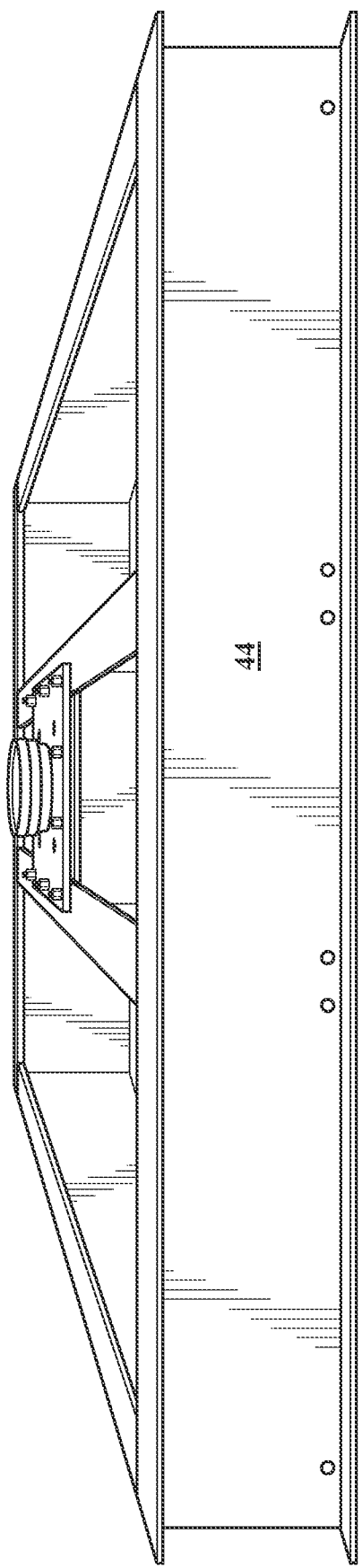
FIG. 6 is a rear perspective view of a ballast tray assembly.
Figure 7:
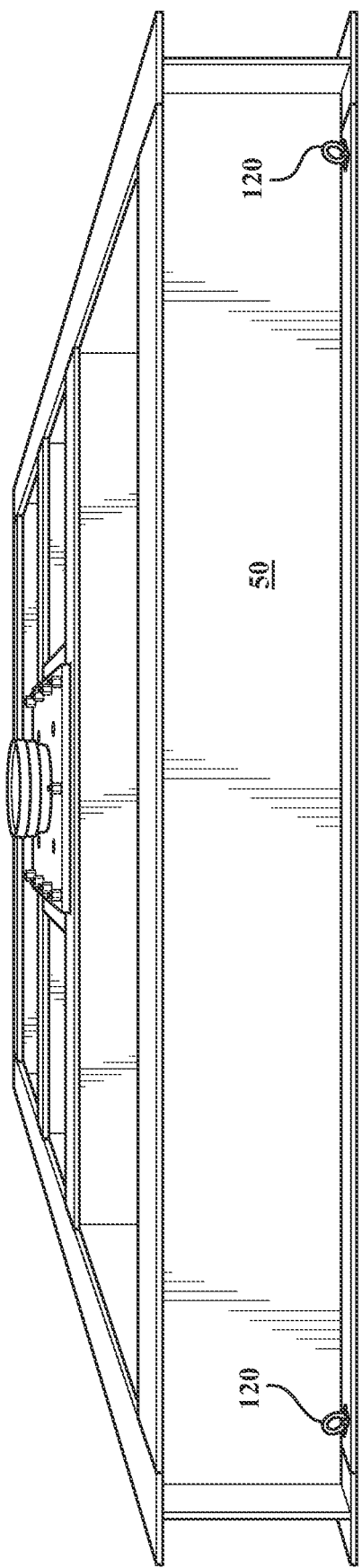
FIG. 7 is a first side perspective view of a ballast tray assembly.
Figure 8:
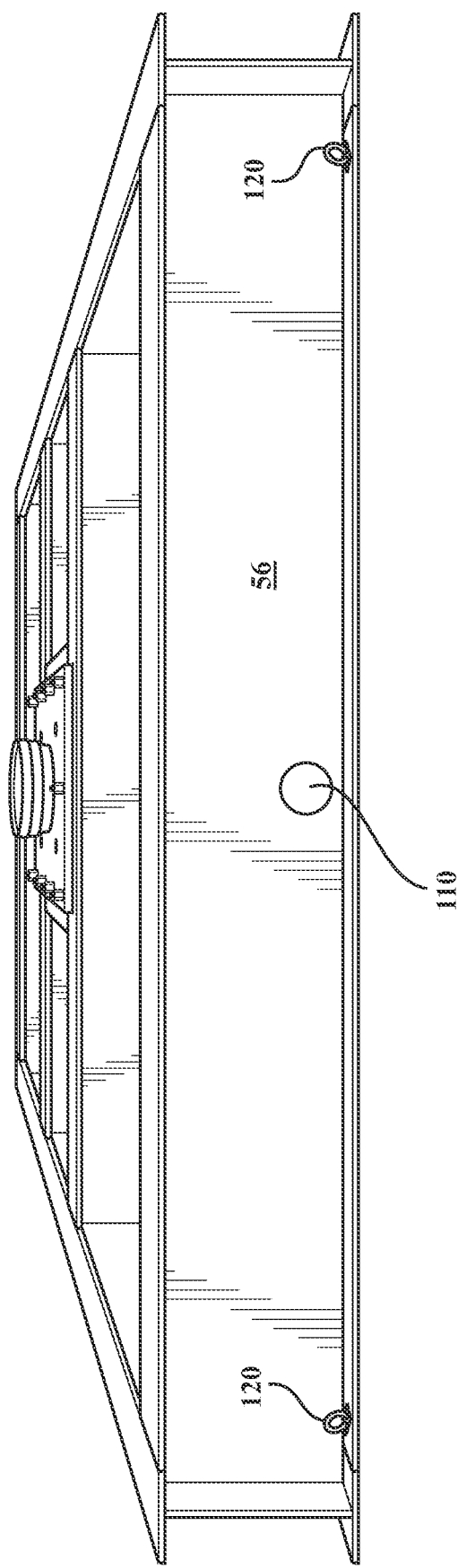
FIG. 8 is a second side perspective view of a ballast tray assembly.
Figure 9:
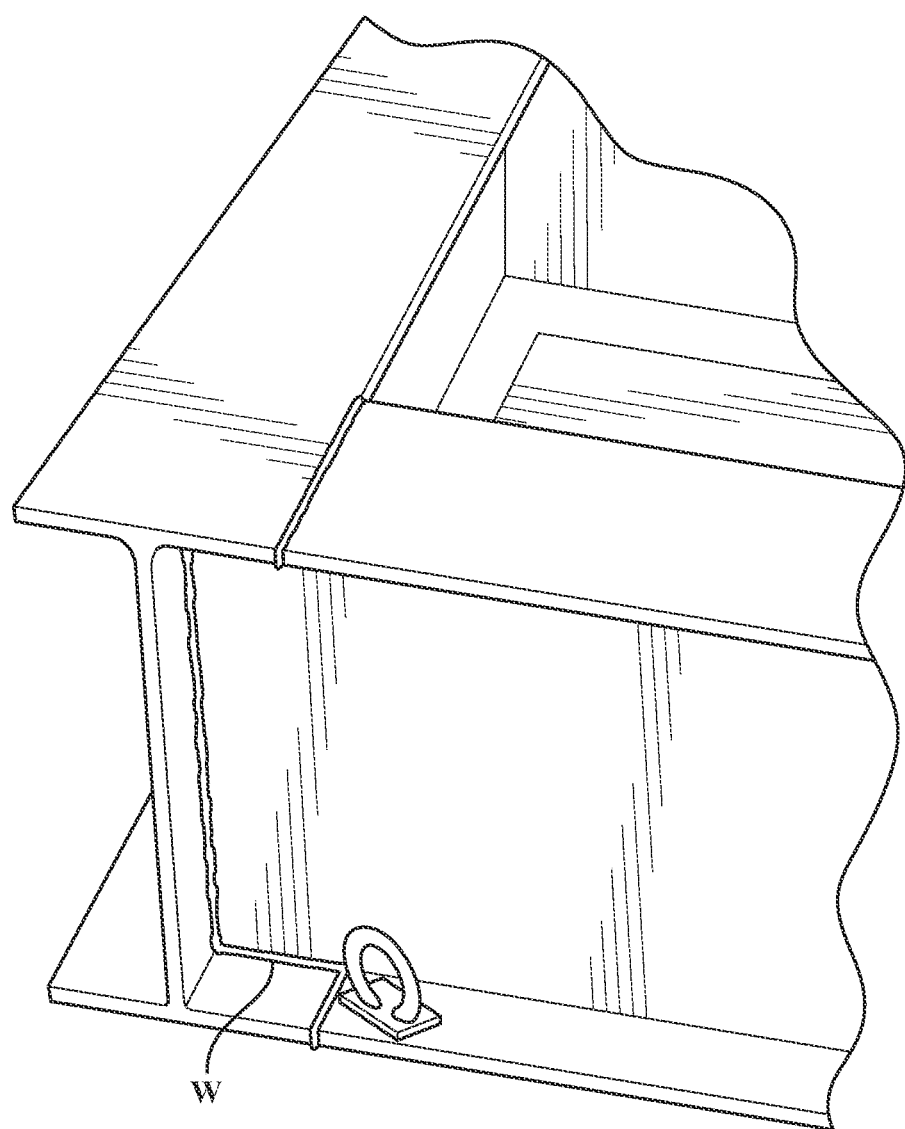
FIG. 9 is an expanded partial corner perspective view of a ballast tray assembly showing a weld.

With reference to FIG. 4, the ballast tray 22 is typically manufactured primarily of metallic materials such as steel I-beams which are welded together in a rectilinear arrangement 40 of I-beams. A first side-beam 42 (FIG. 5) and a second side-beam 44 (FIG. 6) sandwich a first cross-beam 50 (FIG. 7), a second cross-beam 52, a third cross-beam 54, and a fourth cross-beam 56 (FIG. 8) therebetween. The first cross-beam 50, the second cross-beam 52, the third cross-beam 54, and the fourth 56 cross-beam may include profiled ends to interface with the first side-beam 42 and the second side-beam 44 to facilitate welding W (FIG. 9) therebetween. A first interface beam 60 and a second interface beam 62 are parallel to the first side beam 42 and the second side-beam 44 between the second cross-beam 52 and the third cross-beam 54 to provide a support interface for the interface plate 26.

Figure 10:
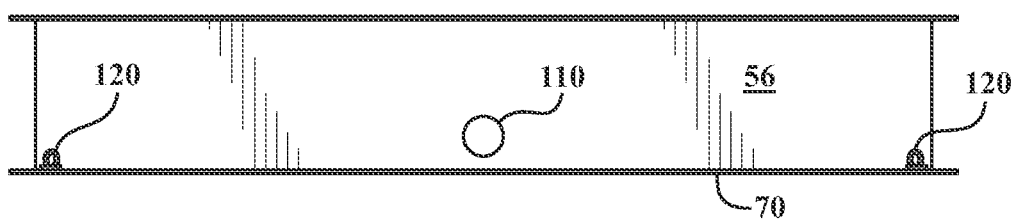
FIG. 10 is a side view of a ballast tray assembly according to a disclosed non-limiting embodiment.
Figure 11:
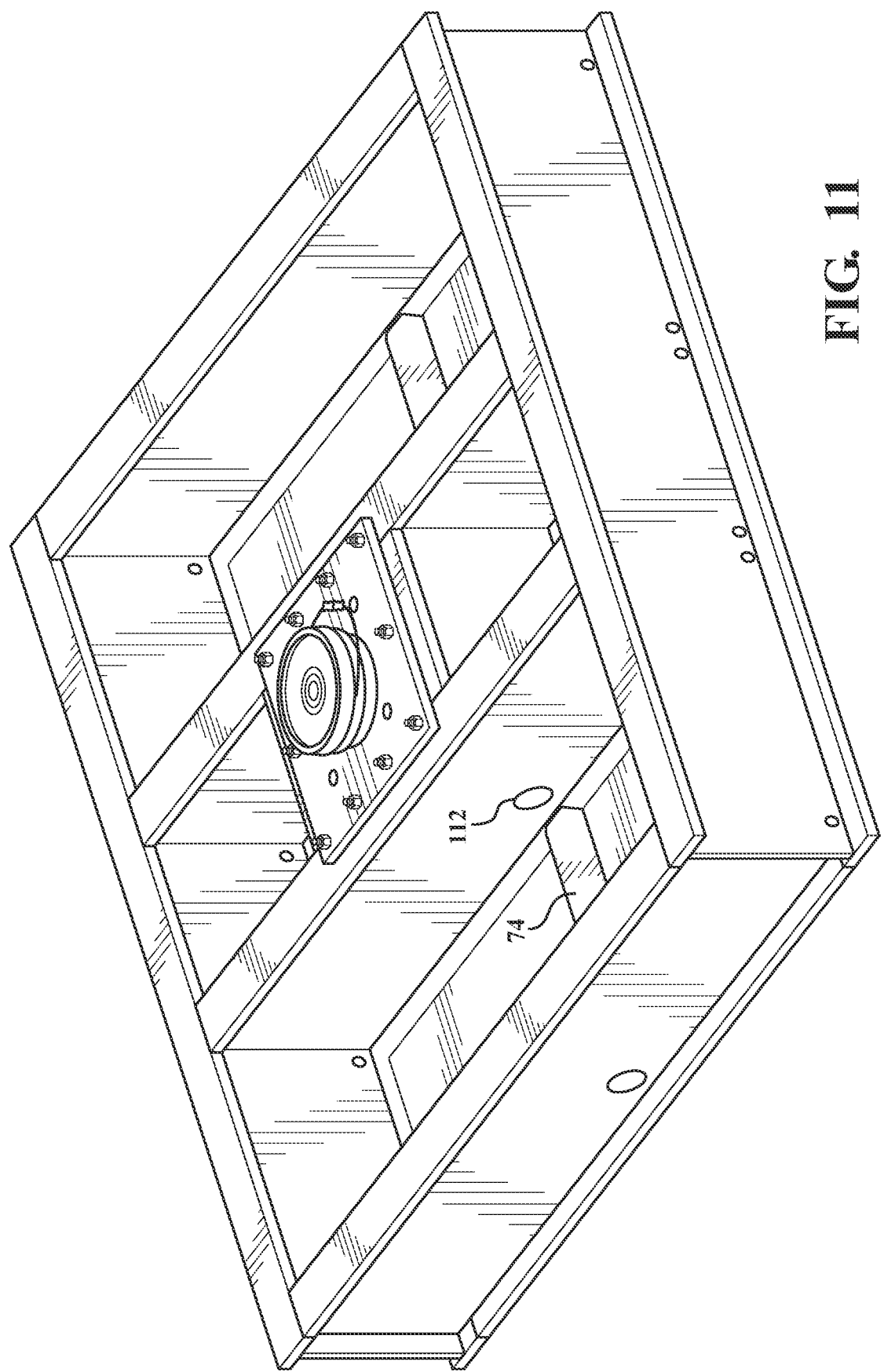
FIG. 11 is a top perspective view of a ballast tray assembly according to a disclosed non-limiting embodiment.

A subfloor 70 (FIG. 10) and floor supports 72, 74 (also shown in FIG. 11) are welded to the rectilinear arrangement 40 to receive the concrete. The rectilinear arrangement 40 in this embodiment forms seven compartments 80, 82, 84, 86, 88, 90, 92, each of which may include a drain hole 100. The floor supports 72, 74 are parallel to the first side-beam 42 and the second side-beam 44 and are defined along an axis A that passes through a center B of the ballast tray 22.

A first routing aperture 110 (FIGS. 8 and 10), and a second routing aperture 112, (FIG. 11) may be respectively located though the fourth cross-beam 56 and the third cross-beam 54, to provide for cable routing. The first and second routing aperture 110, 112, may, for example, be 4 inches in diameter to receive a pipe such as a PVC pipe. The first and second routing aperture 110, 112, provide a cable path to the center compartment 86 for routing cable, wires, etc. to the equipment on the tower 24 or that which is supported by the ballast tray 22.

A pad eye 120 may be mounted adjacent each corner of the ballast tray 22 such as on the first cross-beam 50 and the fourth cross-beam 56. The pad eyes 120 provide for convenient integral lifting of the ballast tray 22.

Figure 12:
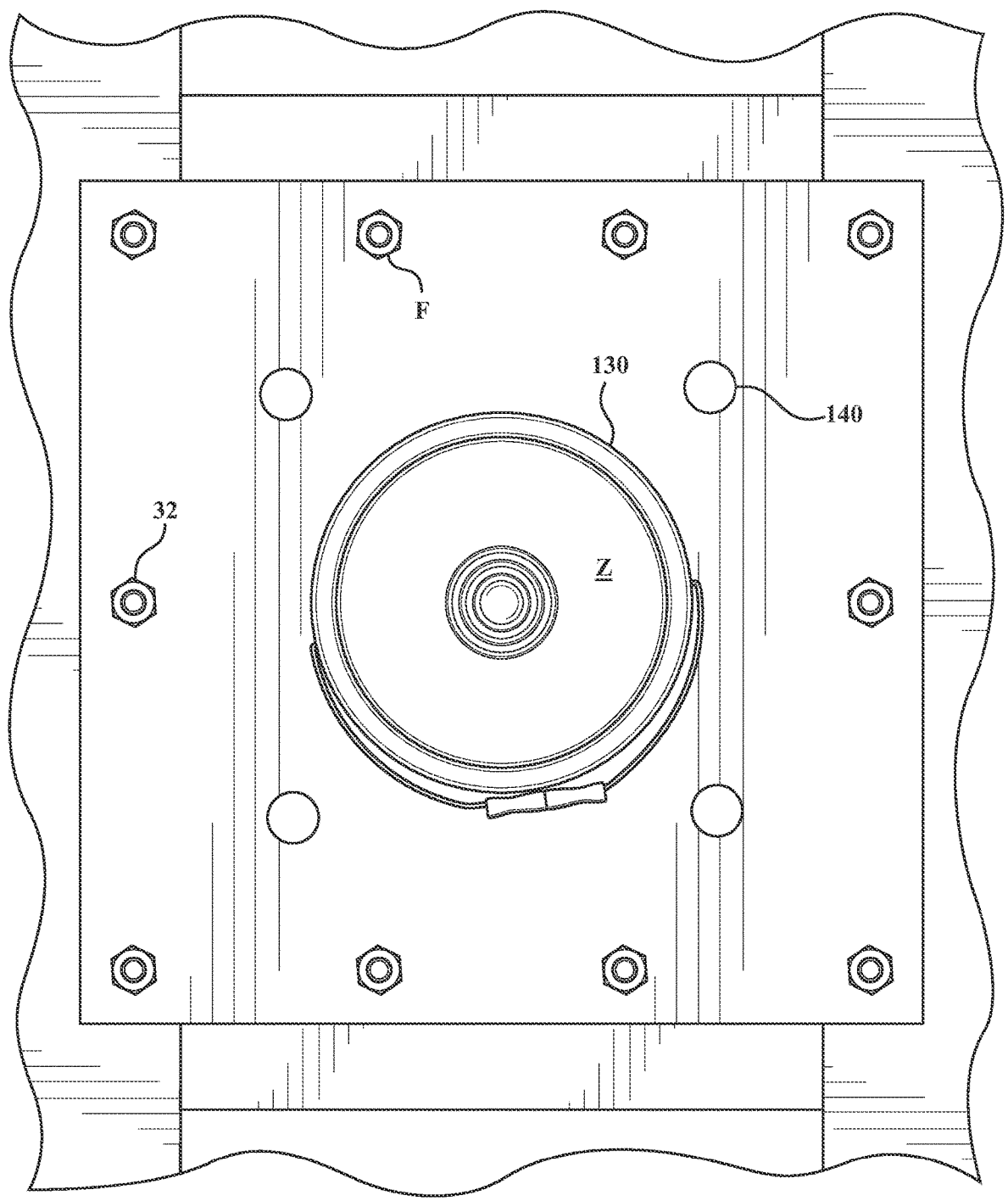
FIG. 12 is an expanded partial top view of a ballast tray assembly according to a disclosed non-limiting embodiment illustrating a bucket retained by an interface plate thereof.

The beams around the center compartment 86, (the second cross-beam 52, the third cross-beam 54, the first interface beam 60 and the second interface beam 62 supports the interface plate 26 (FIG. 12). The flanges around the center compartment 86 include the ballast tray assembly aperture arrangement 32, here shown as ten apertures, which correspond to the interface plate aperture arrangement 30. The interface plate 26 is attached via the ballast tray assembly aperture arrangement 32 and the interface plate aperture arrangement 30 with a multiple of fasteners F (FIG. 12).

With reference to FIG. 12, the interface plate 26 includes the mount aperture arrangement, here shown as four apertures, within the interface plate aperture arrangement 30. A central aperture 130 is located at the center of the interface plate 26 and within the mount aperture arrangement. The central aperture 130 in the disclosed embodiment is sized to receive a container such as a bucket Z that contains the hardware, i.e., nuts, bolts, etc., for assembly of the tower 24 to the interface plate 26. The storage of the bucket within the central aperture 130 facilitates transport and organization of ballast tray 22 and an associated interface plate 26 and hardware therefor.

In one example, per the TIA-222-G, Structural Standard for Antenna Supporting Structures and Antennas, Applicant has determined that the ballast tray 22 effectively resists overturning and sliding for a 30 foot tall 6 inch square tubing and a 4 foot tall top pipe (FIG. 13).

Figure 14:
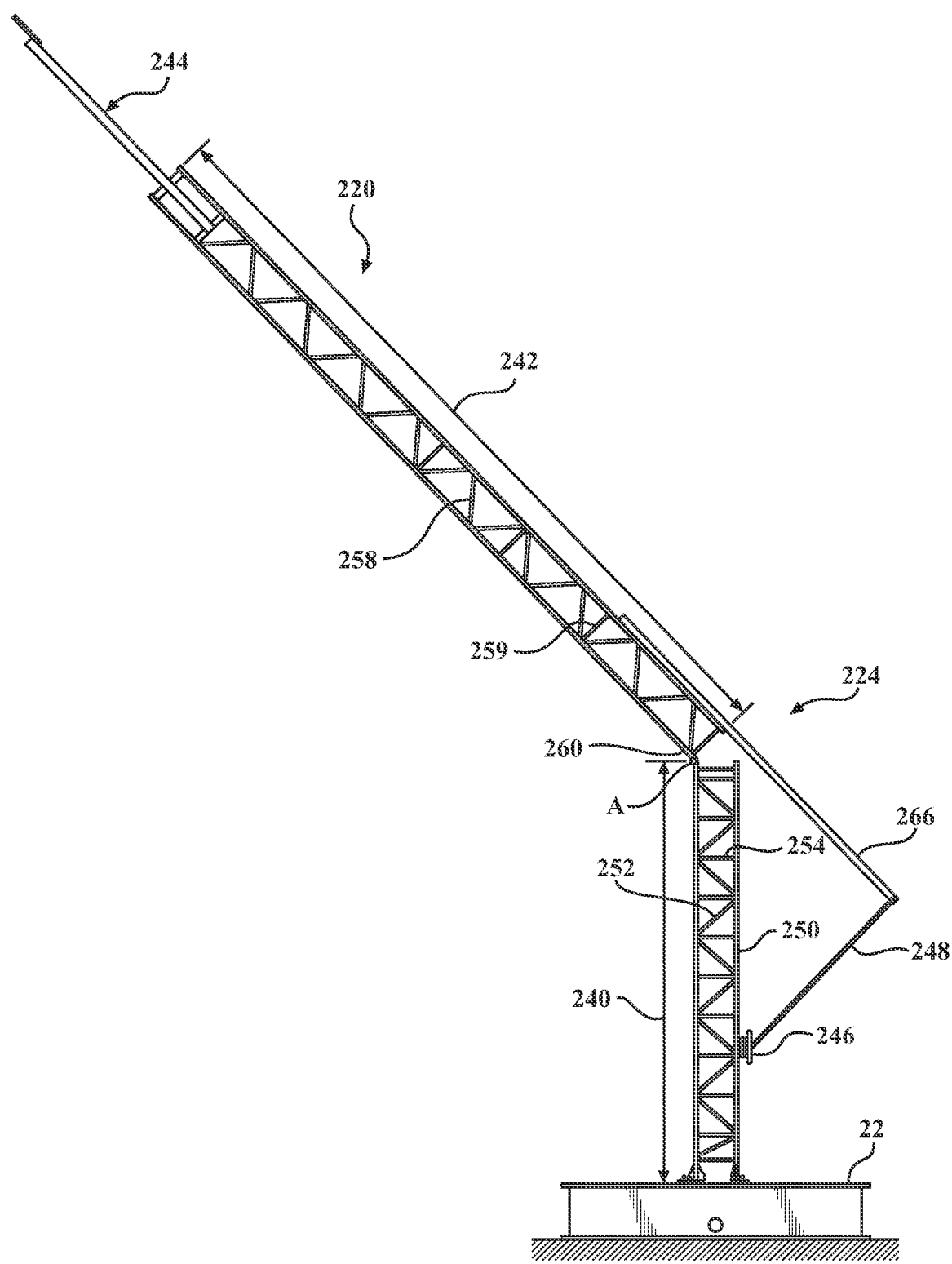
FIG. 14 is a side view of a hinged lattice tower structure according to one disclosed non-limiting embodiment.

FIG. 14 illustrates a lattice tower structure 220 that is utilized to erect various instruments. The lattice tower structure 220 may be mounted to the ballast tray 22. Although a hinged lattice tower structure is illustrated in the disclosed embodiment, other towers such as non-hinged towers, poles, etc., may also benefit herefrom.

The tower 224 may be assembled from a multiple of sections such as a base lattice section 240, a tower lattice section 242, and a top mast section 244. It should be appreciated that any number of sections either as a lattice or other arrangement may benefit herefrom. In one embodiment, the base lattice section 240 may be manufactured of an all galvanized steel while the tower lattice section 242 may be manufactured of aluminum. In this embodiment, the base lattice section 240 is 10 feet tall, the tower lattice section 242 is 20 feet tall and the top mast section 244 is 5 feet tall, however, other hinged lattice towers of other heights and configurations will also benefit herefrom.

The base lattice section 240 may be of an all welded construction utilizing 1018 minimum strength 1 inch diameter SR hot dipped galvanized steel legs 250 with 1018 minimum strength 0.5 inch diameter SR hot dipped galvanized steel diagonals 252 and horizontals 254. The legs 250, diagonals 252 and horizontals 254 may be solid steel. In one embodiment, the legs 250 are arranged in a triangular pattern.

The tower lattice section 242 may be of an all welded construction utilizing 6061 T6 1 inch schedule 40 aluminum round legs 256 with 6061 T6 ⅝" aluminum solid rod diagonals 258 and horizontals 259. The legs 256, diagonals 258 and horizontals 259 may be solid aluminum. In one embodiment, the legs 256 are arranged in a triangular pattern.

A hinge assembly 260 is mounted to the base lattice section 40 and the tower lattice section 242, such that the tower lattice section 242 is foldable, e.g., tiltable, pivotable, hingeable, etc., about a pivot axis A formed by the hinge assembly 260 between one or more tilted positions whereby the tower lattice section 242 is non-parallel to the base lattice section 240.

A winch 246 is mounted to the base lattice section 240 to deploy and retract a cable 248 that is attached to a raising and lowering arm 266 that extends from the tower lattice section 242. The winch 246 may include any appropriate locking mechanism that may be manipulated by the operator to temporarily prevent or at least reduce the likelihood of the rotation of a crank to maintain the tower in a desired position. One or more ratcheting mechanisms may also be used in relation to the winch. The raising and lowering arm 266 provides a mechanical advantage to the movement of the tower lattice section 242 with respect to the base lattice section 240.

Figure 15:
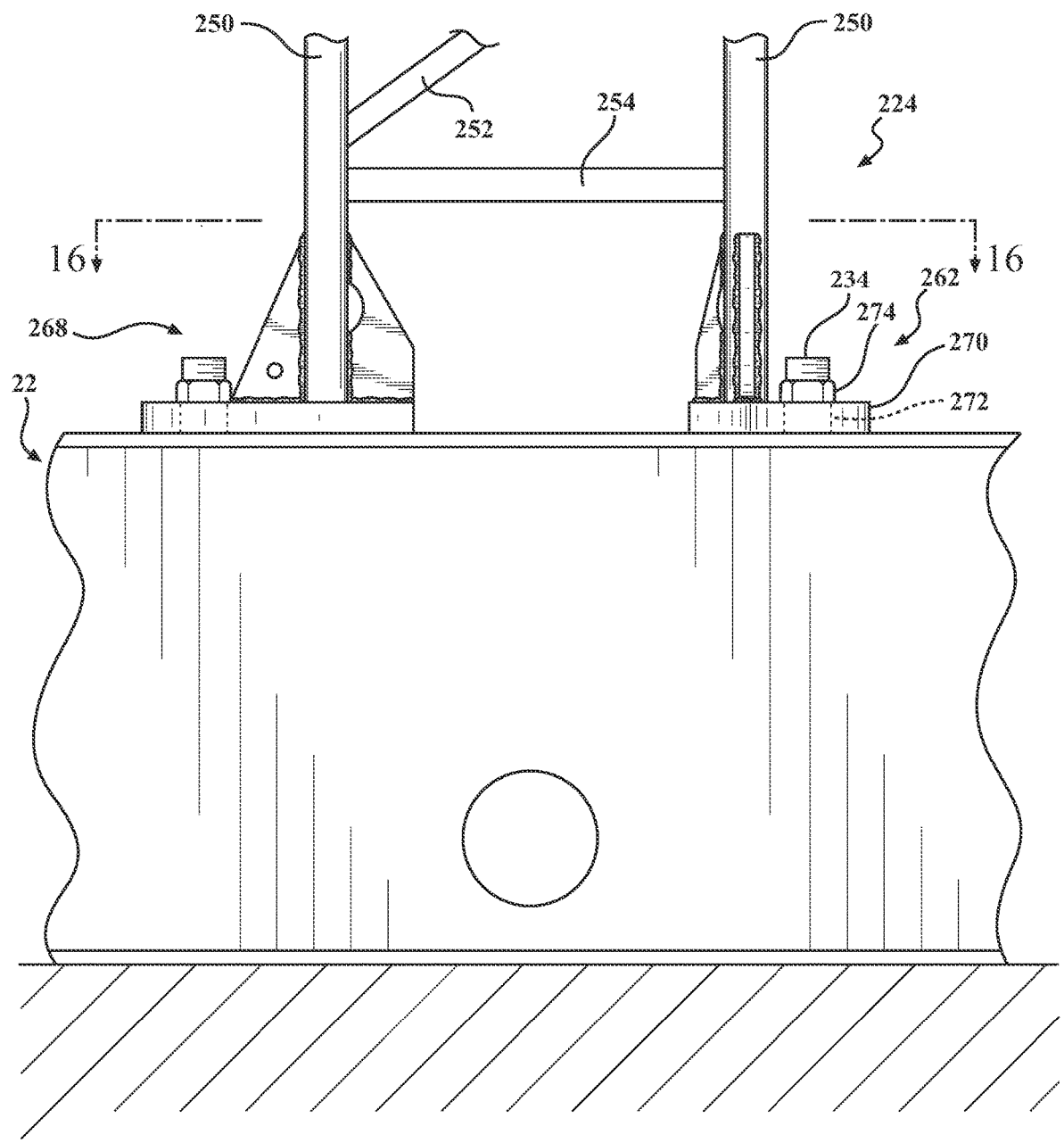
FIG. 15 is an expanded partial side view of a base assembly for the hinged lattice tower structure according to a disclosed non-limiting embodiment.
Figure 16:
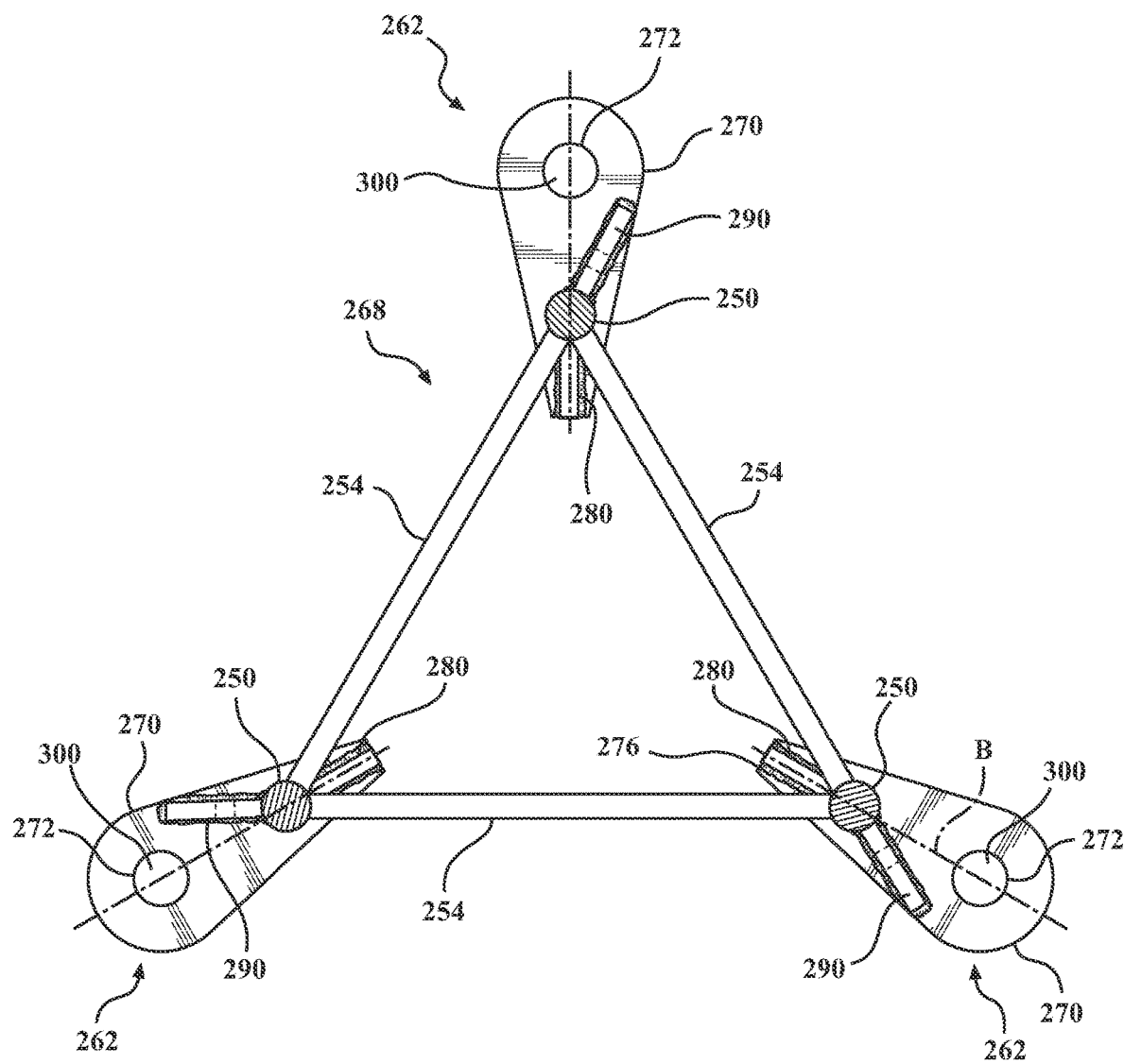
FIG. 16 is a sectional top view of the base assembly of FIG. 15.

With reference to FIG. 15, the tower 224 is fastened to the interface plate 26 of the ballast tray 22 via a base assembly 268 (FIG. 16) that receives the three anchor base bolts 234. The base assembly 268 of the base lattice section 240 includes a base flange assembly 262 on each of the three legs 250. Each base flange assembly 262 includes a foot 270 with an aperture 272 to receive the anchor base bolts 234 which is then retained with a nut 274.

Figure 3:
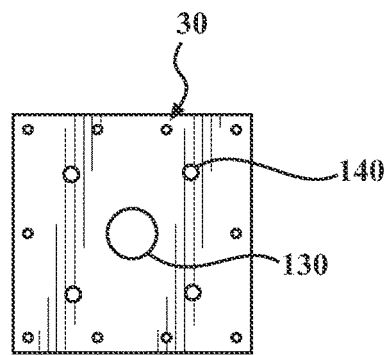
FIG. 3 is a top view of an interface plate according to a disclosed non-limiting embodiment.

The interface plate 26 is specific to the desired tower 224 that is to be mounted thereto. That is, the aperture 272 within each foot 270 of each base flange assembly 262 forms a specific tower aperture arrangement 300 which corresponds to the mount aperture arrangement 140 (FIG. 3). That is, the ballast tray 22 is a common component which is individualized by attachment of one of a multiple of different interface plates 26 each of which has a specific mount aperture arrangement 140 for the desired tower aperture arrangement 300 which is to be mounted thereto.

Figure 17:
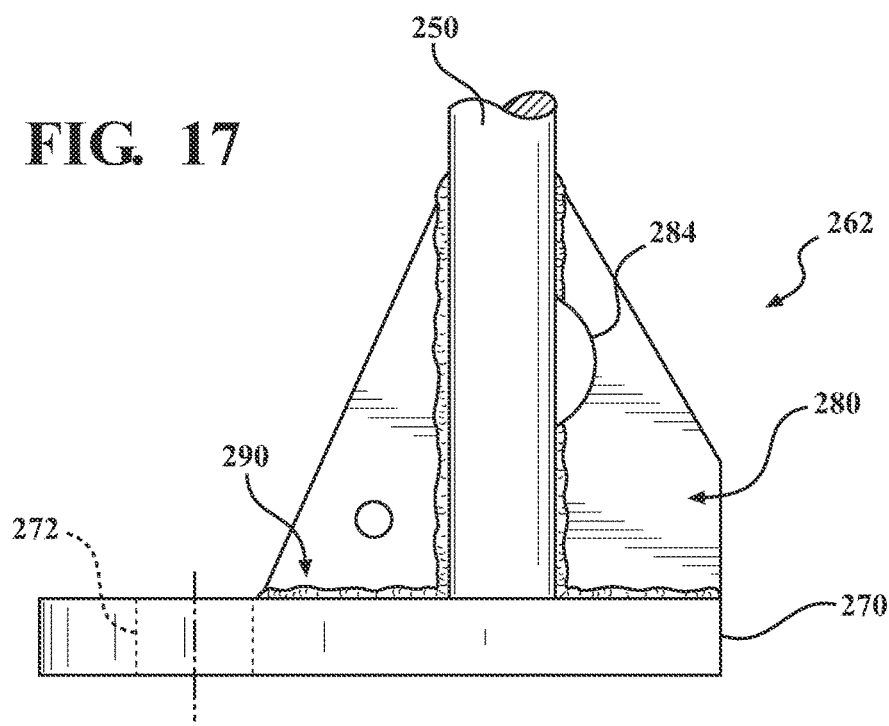
FIG. 17 is an expanded side view of a base flange assembly according to a disclosed non-limiting embodiment.
Figure 18:
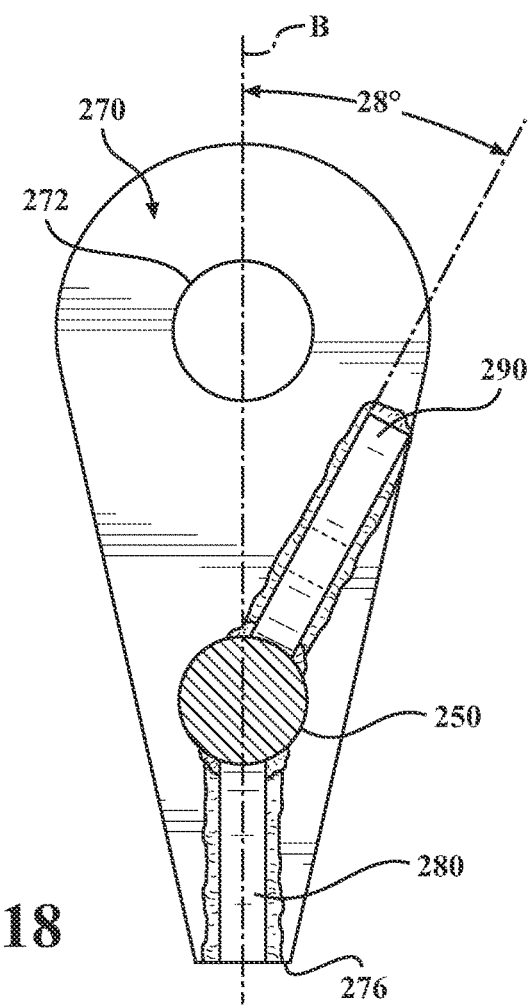
FIG. 18 is a top view of the base flange assembly of FIG. 17.

With reference to FIG. 17, each base flange assembly 262 includes an inner gusset 280 and an outer gusset 290 that are both welded to the foot 270 and the respective leg 250 (FIG. 18). The inner gusset 280 includes a notch 284 that permits welding of the horizontals 254 to the leg 250. The inner gusset 280 is located between the two horizontals 254 that are welded to the leg 250 and extend to an inner edge 276 of the foot 270. In one example, the inner gusset 280 extends 1.625 inches from the leg 250 to the inner edge 276 of the foot 270 along an axis B that is defined between the centers of the aperture 272 and the leg 250.

The outer gusset 290 extends outward toward the aperture 272. The outer gusset 290 in this embodiment defines an angle with respect to axis B of 28 degrees (FIG. 18). In one example, the outer gusset 290 extends 2.0 inches to an outer edge 278 of the foot. The outer gusset 290 essentially extends the horizontals 254 to provide a further interface with the foot 270.

The individualized attachment of one of a multiple of different interface plates 26, each of which has a specific mount aperture arrangement 140 for the desired tower, facilitates assembly and simplifies production.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A tower structure, comprising:
a tower comprising a tower aperture arrangement;
a ballast tray comprising a support interface; and
an interface plate comprising a mount aperture arrangement and an interface plate aperture arrangement, the mount aperture arrangement within the interface plate aperture arrangement, the interface plate attachable to the support interface, the mount aperture arrangement specific to the tower which is to be mounted to the interface plate at the mount aperture arrangement via the tower aperture arrangement;
a foot welded to each of a multiple of legs of the tower, each foot having an aperture to form the tower aperture arrangement;
an inner gusset welded to each foot and the respective leg, the inner gusset extends toward an inner edge of the respective foot; and
an outer gusset welded to each foot and the respective leg, the outer gusset defines a 28 degree angle with respect to an axis between a center of the aperture in the foot and the leg.

2. The tower structure as recited in claim 1, wherein the tower is a hinged lattice tower.

3. The tower structure as recited in claim 2, wherein the tower comprises a base lattice section that comprises a first leg, a second leg, and a third leg forming a triangular base lattice section of the tower, the first, the second and the third leg each constructed of galvanized steel.

4. The tower structure as recited in claim 3, further comprising a tower lattice section hinged to the base lattice section, the tower lattice section comprises a first, second and third leg each constructed of aluminum.

5. The tower structure as recited in claim 1, wherein the tower is attachable to the mount aperture arrangement via a fastener through each aperture of the mount aperture arrangement and the tower aperture arrangement.

6. The tower structure as recited in claim 1, wherein the support interface comprises a ballast tray assembly aperture arrangement, the interface plate attachable to the support interface via a fastener through each aperture of the ballast tray assembly aperture arrangement and a respective aperture of the interface plate aperture arrangement.

7. The tower structure as recited in claim 6, further comprising a central aperture located at a center of the interface plate, wherein the central aperture is sized to receive a container.

8. The tower structure as recited in claim 6, wherein the interface plate is welded to the support interface.

9. The tower structure as recited in claim 8, wherein the tower is attachable to the mount aperture arrangement via a fastener through each aperture of the mount aperture arrangement and the tower aperture arrangement.

10. The tower structure as recited in claim 1, wherein the support interface is formed by a ballast tray assembly aperture arrangement through a multiple of flanges around a center compartment.

11. The tower structure as recited in claim 10, further comprising a multiple of I-beams which comprise the multiple of flanges around the center compartment.

12. A tower structure, comprising:
a tower comprising a tower aperture arrangement;
a ballast tray comprising a support interface; and
an interface plate comprising a mount aperture arrangement and an interface plate aperture arrangement, the mount aperture arrangement within the interface plate aperture arrangement, the interface plate attachable to the support interface, the mount aperture arrangement specific to the tower which is to be mounted to the interface plate at the mount aperture arrangement via the tower aperture arrangement;
a foot welded to each of a multiple of legs of the tower, each foot having an aperture to form the tower aperture arrangement;
an inner gusset welded to each foot and the respective leg, the inner gusset extends toward an inner edge of the respective foot; and
an outer gusset welded to each foot and the respective leg, the outer gusset defines an angle with respect to an axis between a center of the aperture in the foot and the leg, wherein the outer gusset extends for a length greater than the inner gusset with respect to the leg.

* * * * *